June 21, 1966    J. KRITZ ET AL    3,257,638
DOPPLER NAVIGATION SYSTEM
Filed Nov. 21, 1962    12 Sheets-Sheet 1

INVENTORS
JACK KRITZ
SEYMOUR D. LERNER
BY
Nolte & Nolte
ATTORNEYS

June 21, 1966  J. KRITZ ET AL  3,257,638
DOPPLER NAVIGATION SYSTEM
Filed Nov 21, 1962  12 Sheets-Sheet 3

INVENTORS
JACK KRITZ
SEYMOUR D. LERNER
BY
*Nolte & Nolte*
ATTORNEYS

INVENTORS
JACK KRITZ
SEYMOUR D. LERNER
BY Nolte & Nolte
ATTORNEYS

Fig. 12.

INVENTORS
JACK KRITZ
SEYMOUR D. LERNER
BY Nolte & Nolte
ATTORNEYS

Fig. 13b.

3,257,638
DOPPLER NAVIGATION SYSTEM
Jack Kritz, Westbury, and Seymour D. Lerner, Plainview, N.Y., assignors to Janus Products Incorporated, Westbury, N.Y., a corporation of Delaware
Filed Nov. 21, 1962, Ser. No. 239,129
20 Claims. (Cl. 340—3)

This invention relates to a system for use as a navigational guide for water-borne objects. More particularly, this invention relates to an ultrasonic Doppler system capable of accurately indicating the ground speed and distance covered by a boat or the like, and including means for indicating the extent to which the boat has drifted from a set or desired course.

The object of this invention is to provide a relativtly inexpensive and compact assembly capable of accurately indicating the speed of a boat or any water-borne object as it moves across or through a body of water.

Another object is to provide a device, which, in combination with a conventional compass, will readily enable a boatsman to perform an accurate and simple job of navigating.

Still another object is to provide an electronic drift meter capable of indicating the quadrant in which a boat is drifting, and the precise magnitude of the drift.

A further object is to provide a flexible navigational aide for use as a velocity meter and drift meter, which may be readily modified to include means for indicating the distance traveled.

Yet another object is to provide a Doppler navigational device which may be readily modified to include means for indicating the depth of the water.

These and other objects of the invention are accomplished by the use of a set of ultrasonic transmitting transducers and corresponding receiving transducers arrayed on the bottom of a boat. Specifically, four ultrasonic transmitting transducers radiate ultrasonic beams in quadrature towards the floor of the ocean. These beams are reflected from irregularities inherent in the floor to a set of four similarly arrayed receiving transducers. The transducers are arranged to radiate energy in the port-starboard and fore-aft directions of the boat, so that the Doppler frequency shifts detected by a given pair of receiving transducers are directly proportional to the velocity component of the boat along their associated axis. The Doppler frequency shifts in both directions are detected and in accordance therewith direct voltages are produced having magnitudes and polarities indicative of the fore-aft and port-starboard velocity components of the boat. These voltages are converted to sine waves ninety degrees apart in phase, and are summed to produce a resultant wave which has a magnitude proportional to the total velocity or ground speed of the boat, and a phase, relative to the fore-aft voltage, indicative of the extent to which the boat has drifted off course. The total velocity is integrated over a given period of time to provide an indication of the total distance traveled. To provide an indication of the drift angle of the boat, the phase of the total velocity voltage is compared with the phase of the fore-aft velocity voltage.

The system may be provided with a single display which indicates the magnitude of the velocity, the distance traveled, and the drift angle of the boat. By referring to a conventional compass, and considering the direction in which the boat has drifted and the magnitude of the drift, it is a simple matter for the pilot to adjust his course in order to compensate for the undesirable drift. As a further refinement, the transmitter oscillator may be pulse modulated, and the delay in receiving the reflected pulses measured to additionally indicate the depth of the water.

The manner in which these and other objects of the invention are accomplished will be described with reference to the following drawings, wherein.

Figure 1:
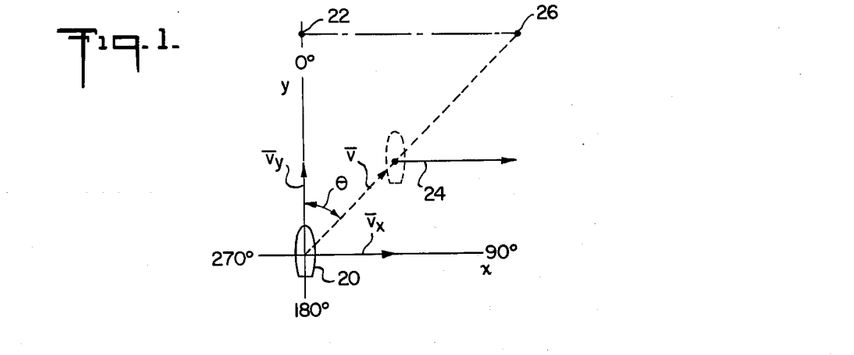
FIG. 1 is a chart used to explain the terms employed.

In FIG. 1, a boat 20 is indicated in solid lines at a starting position. For purposes of clarity, the fore-aft axis of the boat will hereinafter be referred to as the Y-axis, and the port-starboard axis as the X-axis, as illustrated. Assuming that boat 20 is heading for a desired destination indicated at 22, a compass heading will generally be fixed toward that end. If, however, because of current, tide, wind, etc., the boat is subjected to a velocity component indicated by vector 24, boat 20 will drift from its desired position along the Y-axis through the path indicated in dotted lines. Thus, although the boat may be continually headed in the correct compass direction, the actual destination of the boat will be point 26 instead of point 22, which in the case of large bodies of water may comprise a significant error. Hence, if the pilot knows the drift angle $\theta$, it is a simple matter to maintain a compass heading so that the boat is continually headed toward destination 22. As a reference point, the direction in which the boat is heading (the Y-axis) is hereinafter considered to be a zero degree drift angle, increasing in a clockwise direction through three hundred sixty degrees. Thus, a drift angle between ninety and two hundred seventy degrees indicates movement in the Y direction away from destination 22.

The system of this invention is capable of determining the drift angle $\theta$, since it includes means for determining the velocity of the boat in the Y direction, $\overline{V}_Y$, and the velocity of the boat in the X direction $\overline{V}_X$. By vectorially combining $\overline{V}_Y$ and $\overline{V}_X$ and thereafter comparing the total velocity $\overline{V}$ with the velocity in either the X or Y direction, it is possible to compute drift angle $\theta$.

Figure 2:
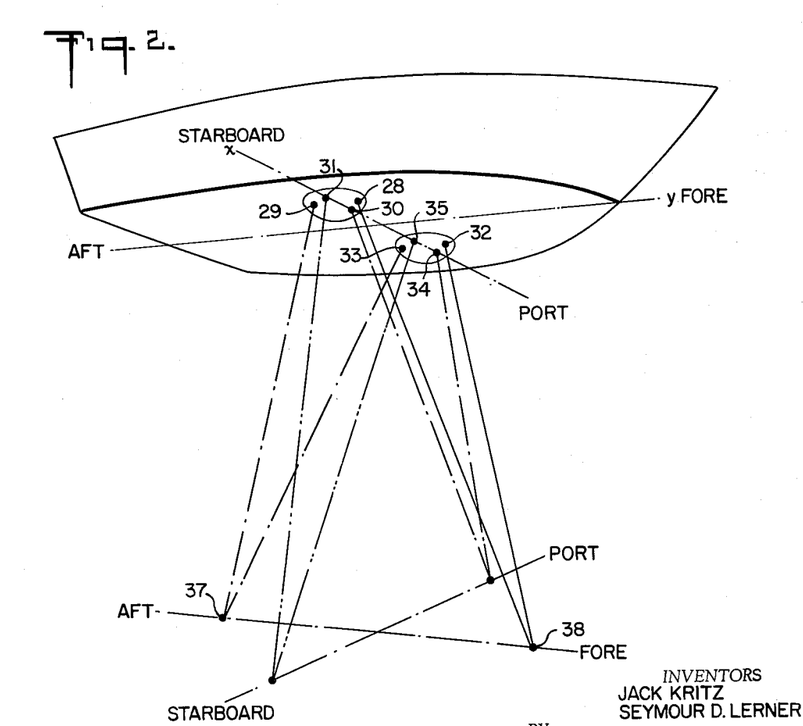
FIG. 2 is a schematic illustration of the manner in which the transducers are arrayed.

The velocity components are determined by an ultrasonic Doppler system whose transmitting and receiving transducers are illustrated schematically in FIG. 2. In this drawing, a set of four highly directional transmitting transducers 28, 29, 30 and 31 are arranged on one side of the keel 27 of boat 20. On the opposite side of keel 27 a set of four directional receiving transducers 32, 33, 34 and 35 are similarly arranged. The nature of these transducers will be described in greater detail below. For the present purposes it is sufficient to note that transmitting transducers produce narrow beams of ultrasonic energy which are reflected from irregularities in the ocean floor to an associated receiving transducer. As shown, transmitting transducers 28 and 29 radiate energy in opposite directions along the Y-axis (i.e. fore and aft, respectively) whereby the reflected energy is received by receiving transducers 32 and 33, respectively. Similarly, transducers 30 and 31 radiate energy in opposite directions along the X-axis (i.e. port and starboard, respectively) so that the reflected energy is received by transducers 34 and 35, respectively. In an operative embodiment, the beams were radiated at an angle of thirty degrees with respect to the vertical and with a width of three and one half degrees.

The system depends upon the fact that the floor of an ocean, or any body of water, is never perfectly flat and will therefore radiate the ultrasonic energy in all directions, so that at least some of the propagated energy will be reflected to the receiving transducers. As will become more apparent below, the use of two transducers along each axis compensates for frequency changes which may be caused by roll, pitch or yaw of the boat. Additionally, this arrangement is helpful in determining whether the velocity component in that direction is positive or negative (i.e. fore or aft, port or starboard).

If there is relative motion between the boat and the ocean floor in the Y direction, the ultrasonic energy radiated by transducers 28 and 29 will be received by transducers 32 and 33 at a different frequency since these transducers are moving relative to the points of reflection 37 and 38. This is in accordance with the well known Doppler law. The change of frequency, or difference frequency $f_Y$, is proportional to the relative velocity of the boat along the Y- or fore-aft axis. Similarly, if the boat has a velocity component in the X direction, a difference frequency $f_X$ will be produced in receiving transducers 34 and 35 proportional to the velocity of the boat along the X- or port-starboard axis.

Figure 3:
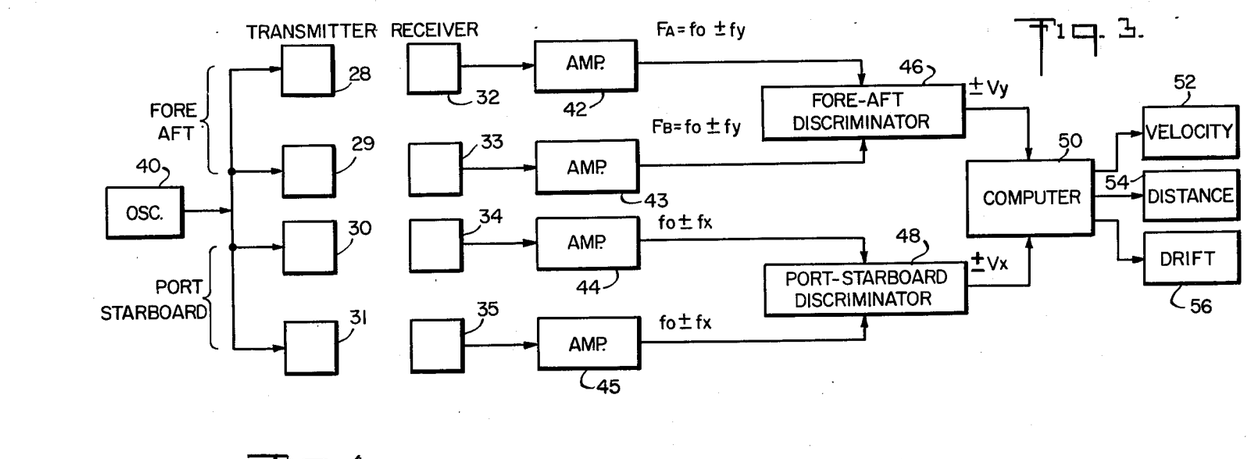
FIG. 3 is a general block diagram of the electronic circuits of the invention.

A system for deciphering the Doppler information detected by receiving transducers 32, 33, 34 and 35 is illustrated in block diagram form in FIG. 3. The transmitter unit of this system includes an oscillator 40 producing a voltage at an ultrasonic frequency $f_0$, which is coupled to the four transmitting transducers 28, 29, 30 and 31. The receiving transducers 32, 33, 34 and 35 are coupled to respective amplifiers 42, 43, 44 and 45 which produce outputs having frequencies related to the magnitude of the boat velocity in a given direction. For example, considering the fore-aft transducers and assuming a velocity component in the Y direction, one of the amplifiers 42 and 43 will produce a voltage having a frequency equal to $f_0+f_Y$, while the other amplifier will produce a voltage having a frequency of $f_0-f_Y$. These two frequencies are fed to a fore-aft discriminator 46 whose output is a direct voltage having a magnitude proportion to the magnitude of the velocity along the Y-axis and a polarity corresponding to the direction (fore or aft) of that velocity. Similarly, a port-starboard discriminator 48 receives the output from amplifiers 44 and 45, and produces an output voltage indicative of the magnitude and direction of the boat velocity along the X-axis.

The direct voltages from discriminators 46 and 48, indicative of the Y and X velocity components, respectively, are coupled to a computer 50 which determines the total velocity, the distance traveled, and the drift angle of the boat, which information is displayed on indicators 52, 54 and 56, respectively.

Figure 4:
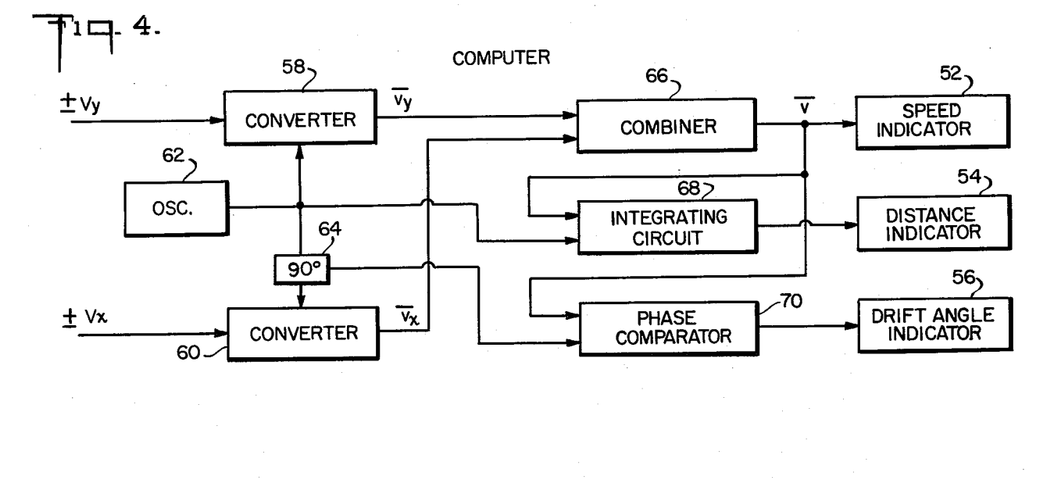
FIG. 4 is a block diagram of a computer which may be used with the invention.

A general block diagram of computer 50 is shown in FIG. 4. At the input end, computer 50 includes converters 58 and 60 which are driven by a reference oscillator 62 to convert the D.C. inputs to an alternating output voltage. The positive or negative direct voltage indicative of the fore-aft velocity is applied to the input of converter 58 and converted to an alternating voltage in phase with oscillator 62. The port-starboard direct voltage is applied to converter 60 which converts this voltage to an alternating voltage ninety degrees out of phase with the oscillator voltage (and thus the output of converter 58) because of delay 64 which is inserted between oscillator 62 and converter 60. Thus at the output of converter 58 an alternating voltage is produced at the reference frequency having a magnitude proportional to the Y-axis velocity. At the output of converter 60 there is an alternating voltage of the same frequency having a magnitude proportional to the X-axis velocity of the boat, but differing in phase by ninety degrees with respect to the output of converter 58. Thus, vectors representing the converter output voltages correspond in both magnitude and direction with the velocity vectors $\overline{V}_Y$ and $\overline{V}_X$.

The output of converters 58 and 60 are vectorially added in combiner 66 to represent the sum of $\overline{V}_X$ and $\overline{V}_Y$, or the total velocity of the boat with respect to the ocean floor. The output of combiner 66 approximates a sine wave whose magnitude is proportional to the total velocity or ground speed of the boat, and whose phase with respect to the phase of reference oscillator 62 is indicative of the drift angle of the boat.

The output of combiner 66 is fed to an integrating circuit 68 and a phase comparison circuit 70. Integrating circuit 68 produces an output pulse after a predetermined distance has been traversed by the boat. Oscillator 62 is shown connected to integrating circuit 68 in order to provide the time component necessary to integrate the total velocity of the boat produced at the output of combiner 66, with time, in order to produce the distance component fed into distance indicator 54. The output pulses of integrator 68 are counted by the distance indicator 54, which may be calibrated to indicate distance in nautical miles, miles or any other parameter.

The output of reference oscillator 62 is also fed through delay 64 to an input of phase comparator 70. Phase comparator 70 produces at its output a voltage proportional to the phase difference between the output of combiner 66 and the output of reference oscillator 62. Delay 64 compensates for the ninety degree shift inherent in phase comparator 70. As noted above, the difference in phase between these two voltages is a measure of the drift angle of the boat, so that the comparator output voltage may be coupled to a drift angle indicator 56 wherein a conventional meter may be calibrated to produce an indication of the extent to which the boat has drifted from its set course. The manner in which an indication is offered of the quadrant in which the boat is drifting, will be explained below.

Figures 5, 5A:
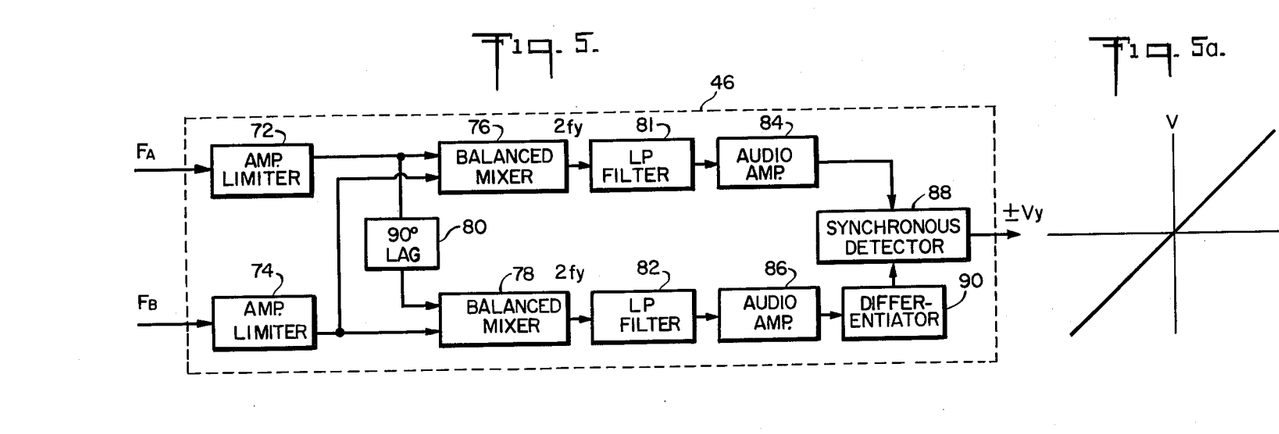
FIG. 5 is a block diagram of a discriminator which may be used with the invention.
FIG. 5A is a diagram of the discriminator characteristic.

FIG. 5 is a block diagram of the fore-aft discriminator 46 (of FIG. 3). Since discriminators 46 and 48 are identical, only one discriminator is shown and described.

Amplifiers 42 and 43 may be considered to produce output voltages having frequencies $F_A$ and $F_B$, respectively. It will be recalled that these frequencies are equal to the carrier frequency $f_0$ plus or minus the Doppler frequency shift in the fore-aft direction $f_Y$. The purpose of the discriminator is to produce an output voltage $V_Y$ having a magnitude equivalent to the Y component of the velocity and a sign indicative of the direction in which that velocity occurs. Thus, it is necessary that the discriminator have a linear characteristic through the origin, as illustrated in FIG. 5A, whereby a frequency shift in one direction produces a positive output voltage, and a frequency shift in the opposite direction produces a negative output voltage. In other words, when $F_A$ is greater than $F_B$ (indicating movement of the boat along the fore-aft axis toward the desired destination) $V_Y$ should have a positive sign. When $F_B$ is greater than $F_A$ (indicating that the boat is drifting along the fore-aft axis away from the destination) $V_Y$ should have a negative value.

The voltages having frequencies $F_A$ and $F_B$ are fed to amplifier limiters 72 and 74, respectively, to stabilize the amplitude of the signals at a fixed value. The outputs of amplifier limiters 72 and 74 are fed to a balanced mixer 76 whose output voltage has a frequency equal to the difference of the input voltages. Since one of the input voltages is at a frequency of $f_0+f_y$ and the other a frequency of $f_0-f_y$, the output of the balanced mixer will be a voltage at a frequency at $2f_y$.

A second balanced mixer 78 receives the RF output of amplifier limiter 72, $F_A$, passed through a delay 80 to provide a ninety-degree lag. The other input of mixer 78 is coupled directly to the RF output of amplifier limiter 74. Since the difference in frequencies applied to mixer 78 is the same as the frequency difference applied to mixer, 76, the output in this instance also has a frequency equal to $2f_y$. However, because of the ninety degree RF lag introduced by delay 80, the output of mixer 76 will either lead or lag the output of mixer 78 by ninety degrees depending upon whether the Doppler frequency change was positive or negative, i.e. whether the boat was traveling toward or away from the destination. A vector analysis of the operation of these mixers will readily show that the output of mixer 76 leads that of mixer 78 by ninety degrees when $F_A$ is greater than $F_B$. When $F_B$ is greater than $F_A$ the output of mixer 76 will lag ninety degrees behind the output of mixer 78.

Although both of the mixers are balanced, which theoretically would remove the carrier from the output difference frequency, in practice such is not the case, and low pass filters 81 and 82 are necessary to remove the carrier frequency and its harmonics from the outputs of mixers 76 and 78, respectively. The output of filters 81 and 82 are coupled to audio amplifiers 84 and 86, respectively, to boost the signal to a desired level for detection purposes.

A synchronous detector 88 produces a D.C. output having a level proportional to the frequencies applied to its input. The operation of detector 88 is such that if the voltages applied to its two inputs are in phase the output voltage is positive, while if the voltages are one hundred eighty degrees out of phase the output voltage is negative. Since the voltages of the outputs of ampligers 84 and 86 are ninety degrees out of phase, a differentiator 90 is inserted between amplifier 86 and the input of detector 88 to produce an output voltage having a magnitude proportional to frequency, and a phase lead of ninety degrees. Thus, if the audio output of mixer 78 is ninety degrees behind the output of mixer 76 (indicating movement toward the destination), the ninety-degree lead inserted into the line by differentiator 90 causes the inputs to detector 88 to be in phase so that its output will be a positive voltage. If the output of mixer 78 leads the output of mixer 76 by ninety degrees (indicating drift away from the destination) the additional ninety-degree lead produced by differentiator 90 will cause the input of detector 88 to be one hundred eighty degrees out of phase so that the polarity of the detector output voltage will be negative. In this manner, the required discriminator characteristic illustrated in FIG. 5A is obtained.

Figure 6:
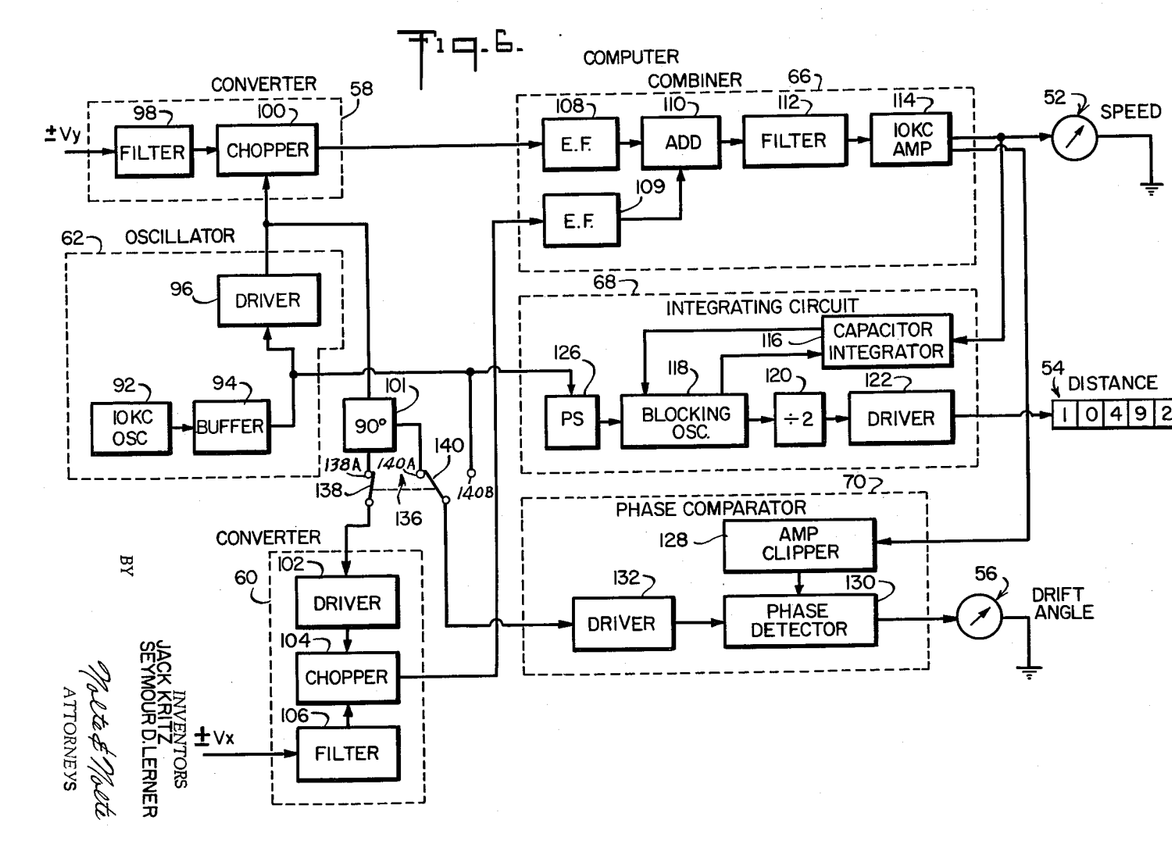
FIG. 6 is a more specific block diagram of the computer shown in FIG. 4.

FIG. 6 specifically illustrates a system which may be utilized as computer 50. As shown, oscillator 62 may include a ten kc. oscillator 92, a buffer 94 and a driver 96. Although conventional, the various components of this system are illustrated schematically and explained in greater detail below. Buffer 94, for example, may be an emitter follower and driver 96 a conventional power amplifier which also provides additional isolation. Converter 58 includes a filter 98 for removing any alternating components which may be present on discriminator voltage $V_Y$. The direct voltage from filter 98 is coupled to the input of a chopper 100 which is also responsive to the output of driver 96 to produce an alternating output voltage which approximates a square wave in phase with the ten kc. voltage from oscillator 92. The output of driver 96 is coupled through a ninety-degree delay unit 101 to a second driver 102. The output of driver 102 is coupled to an input of a second chopper 104 whose other input is $V_X$ with its alternating component removed via filter 106.

The outputs of choppers 100 and 104, which approximate square waves of the same frequency but with a ninety-degree difference in phase, are coupled to emitter followers 108 and 109, respectively, of combiner 66. The output voltages of the emitter followers are combined in adder 110, whose complex output wave form is converted to a sine wave by means of a double-tuned, over coupled bandpass filter 112. It would be possible to convert the square waves from the choppers to sine waves prior to adding them together; however, the present arrangement is desirable from a cost view point. The sine wave from filter 112 is amplified in a ten kc. amplifier 114 whose average output level may be measured by meter 52 to indicate the true speed in knots, miles per hour, or any other desired parameter.

The output of ten kc. amplifier 114 is also applied to a capacitor integrator 116 which totals the values of the pulses received at its input. Since the device is operating at a fixed frequency, the total charge accumulated in integrator 116 is proportional to the distance traveled. Hence, a blocking oscillator 118 is coupled to the output of capacitor integrator 116 so that when a predetermined charge is accumulated in the integrator (indicative of a predetermined distance traveled by the boat) the blocking oscillator is fired to produce an output pulse which is counted in a scale of two counter 120. The output of counter 120 is coupled through a driver 122 to a mechanical counter 54 which is calibrated to step a distance unit (e.g. nautical miles or fractions thereof) for every output pulse of counter 120. It will be obvious to one skilled in the art that various other means may be used to step counter 54 to register any desired distance. When blocking oscillator 118 fires, in addition to triggering the scale-of-two counters 120, it discharges the capacitor in integrator 116, so that the integrator is again ready to accumulate the output velocity pulses from combiner 66. A separate power supply unit 126 may be provided for blocking oscillator 118 to isolate the oscillator from the B plus supply for the remainder of the circuits, since the oscillator, when fired, may draw excessive current effecting the biases applied to other parts of the system.

Figure 7:
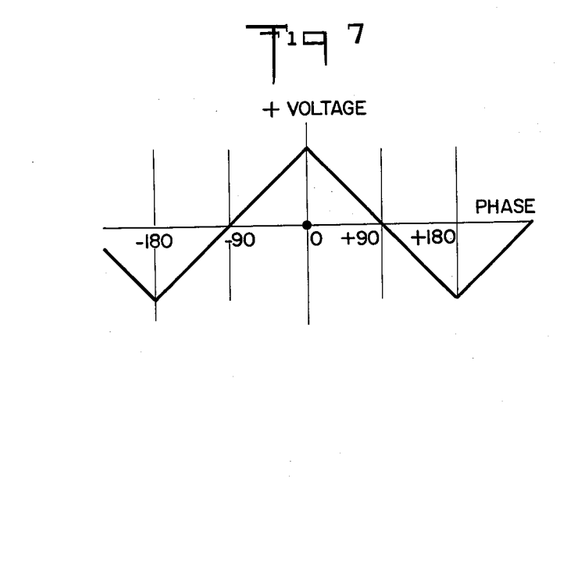
FIGS. 7 and 8 are graphs showing the characteristics of certain discriminators employed in the invention.
Figure 8:
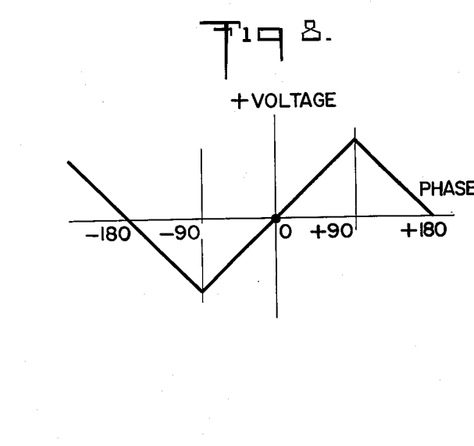

It is recalled that the alternating output voltage of ten kc. amplifier 114 has a phase with respect to the voltage of ten kc. oscillator 92 indicative of the drift angle of the boat. The purpose of phase comparator 70 is to produce an output voltage proportional to this phase difference, and for these purposes comparator 70 includes a covnentional phase detector 130 which has a detection characteristic as shown in FIG. 7, wherein for a zero degree phase difference between the voltages at its inputs, the output is a maximum, while for a ninety degree phase difference in either direction the voltage output is zero. The output of amplifier 114 is coupled through amplifier-clipper 128 to an input of phase detector 130. Since, for practical purposes, it is desired that phase detector 130 produce a zero voltage output for a zero degree drift angle, the other input of phase detector 130 is derived from a ninety degree delay unit 101 which is fed via driver 132 from reference oscillator 62. Because of the ninety degree delay the system will thus have a phase characteristic as illustrated in FIG. 8, wherein for a zero degree drift angle the detector output is zero, increasing to a maximum positive voltage at a ninety degree drift angle and a maximum negative voltage at a minus ninety degree drift angle. As the drift continues towards one hundred eighty degrees, the system output voltage returns to zero.

Figure 9:
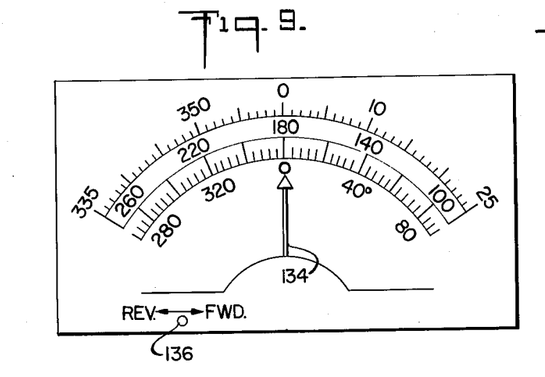
FIG. 9 illustrates a meter calibrated to indicate drift angle in four different quadrants.

A meter having the type of scale indicated in FIG. 9 may be used as indicator 56. With reference again to FIG. 1, as the boat drifts off course or as θ increases toward ninety degrees, pointer 134 moves to the right toward the ninety degree indication. If the boat moves in the other direction towards the two hundred seventy degree axis, meter pointer 134 moves to the left towards the two hundred seventy degree indication to indicate the drift angle in that direction. If the boat drifts beyond the X-axis so that it is actually moving away from destination 22, the voltage to the meter will return toward zero in which case pointer 134 will start to move towards its median position. Normally, it should be obvious to a boatsman whether he is moving towards or away from the destination. However, if a power failure or the like causes the boat to drift aimlessly, it is desirable to indicate whether the boat is in fact drifting toward or away from the destination. For these purposes, a headway switch 136 is provided in the computer system, which, when pressed, causes pointer 134 to move either to the left or the right depending upon the direction in which the boat drifts.

As shown in FIG. 6, the headway switch 136 includes a normally closed movable contact 140 located between contact 140B connected to the output of reference oscillator 62 and contact 140A connected to the output of delay unit 101. Switch 136 is normally at rest in the position as shown in FIG. 6 so that movable contact 140 is connected to contact 140A and movable contact 138, ganged to contact 140, is connected to contact 138A.

When switch 136 is operated and movable contact 138 is disconnected from contact 138A to disconnect delay 101 and movable contact 140 is disconnected from contact 140A and connected to contact 140B, converter 60 cannot be actuated, so that combiner 66 is only responsive to the output of converter 58, which is proportional to the velocity along the fore-aft axis. Hence, the output voltage of ten kc. amplifier 114 will be in phase with the reference voltage of ten kc. oscillator 92 if the voltage $V_Y$ is positive indicating movement toward the destination. If the voltage $V_Y$ is negative, indicating movement away from the destination, the output of amplifier 114 will be one hundred eighty degrees out of phase with the reference voltage of oscillator 92. Since contact 140, when closed, and connected to contact 140B, bypasses the ninety degree delay, the reference frequency of oscillator 92 is fed directly to phase comparator 70 where it is compared with the output of combiner 66. If the two voltages are in a phase, the output voltage of comparator 70 will be positive (see FIG. 7), while if the two voltages are one hundred eighty degrees out of phase the output voltage of comparator 70 will be negative. Thus, if pointer 134 moves to the right in response to a positive voltage when switch 136 is pressed, the boat is moving in a forward direction. If the pointer moves to the left, then the boat is moving or drifting away from the target.

If desired, the meter may be provided with an expanded scale, which, for example, may indicate a drift angle of twenty five degrees in either direction. Since the drift angle meter does no more than measure the voltage output of comparator 70, the manner in which the meter may be adjusted to provide this feature will be obvious to one skilled in the art.

Figure 10:
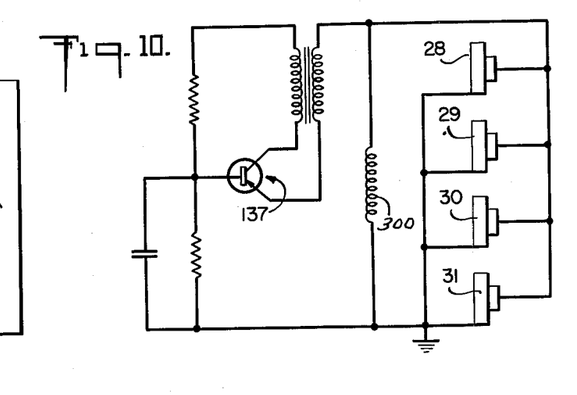
FIG. 10 is a schematic diagram of the transmitter assembly.

FIG. 10 schematically illustrates the transmitter including oscillator 40 and transducers 28–31. These highly directional transducers, as well as the receiving transducers, may be thickness mode piezoelectric vibrators, made of quartz, barium titanate or any other conventional material. Transducers of this nature are known in the art.

The transmitting oscillator 40 includes a transistor 137 and a tank circuit comprising inductance 300 and the four parallel-connected transducers 28, 29, 30 and 31. With this arrangement the transducers serve as the capacitance of an otherwise conventional oscillator. In an operative embodiment the transmitted frequency was nine hundred-eighty kc.

Figure 11:
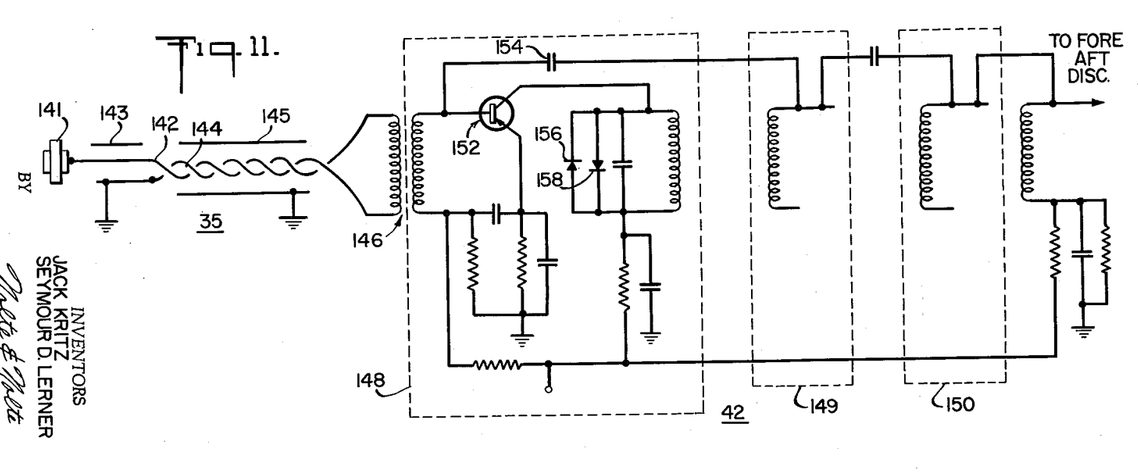
FIG. 11 is a schematic diagram of the input of the receiver assembly.

In the receiving unit each of the four channels up to the discriminators are identical, the first channel, including receiver 35 and amplifier 42, being illustrated in FIG. 11. The receiver includes the piezo-electric crystal 141 which is coupled via a short length of coaxial cable, including an inner conductor 142 and an outer conductor 143, to a shielded twisted pair of conductors including conductor 142 and a conductor 144 interconnected with outer conductor 143. Conductors 142 and 144 are twisted as shown and shielded by outer conductor 145. Both outer conductors 143 and 145 are grounded. This type of connection is common in the electronic arts.

The carrier frequency, plus or minus the Doppler frequency, is coupled via a transformer 146 to amplifier 42 which is a conventional three-stage, neutralized I.F. amplifier. The three stages 148, 149 and 150 are identical and include a transistor 152 and a neutralizing capacitor 154 connected between the bases of successive transistors. The purpose of capacitor 154 is to cancel out the base collector capacity in order to prevent oscillation.

Each of the amplifier stages additionally includes a pair of diodes 156 and 158 to maintain the output voltage within predetermined limits. Diodes 156 and 158 are of the type that do not conduct until the voltage across the diode reaches a predetermined magnitude. In one operative embodiment a voltage of about 0.6 volt was used so that the output of the last stage 150 of amplifiers 42–45 approximated a square wave with a 0.6 volt magnitude.

Figure 12:
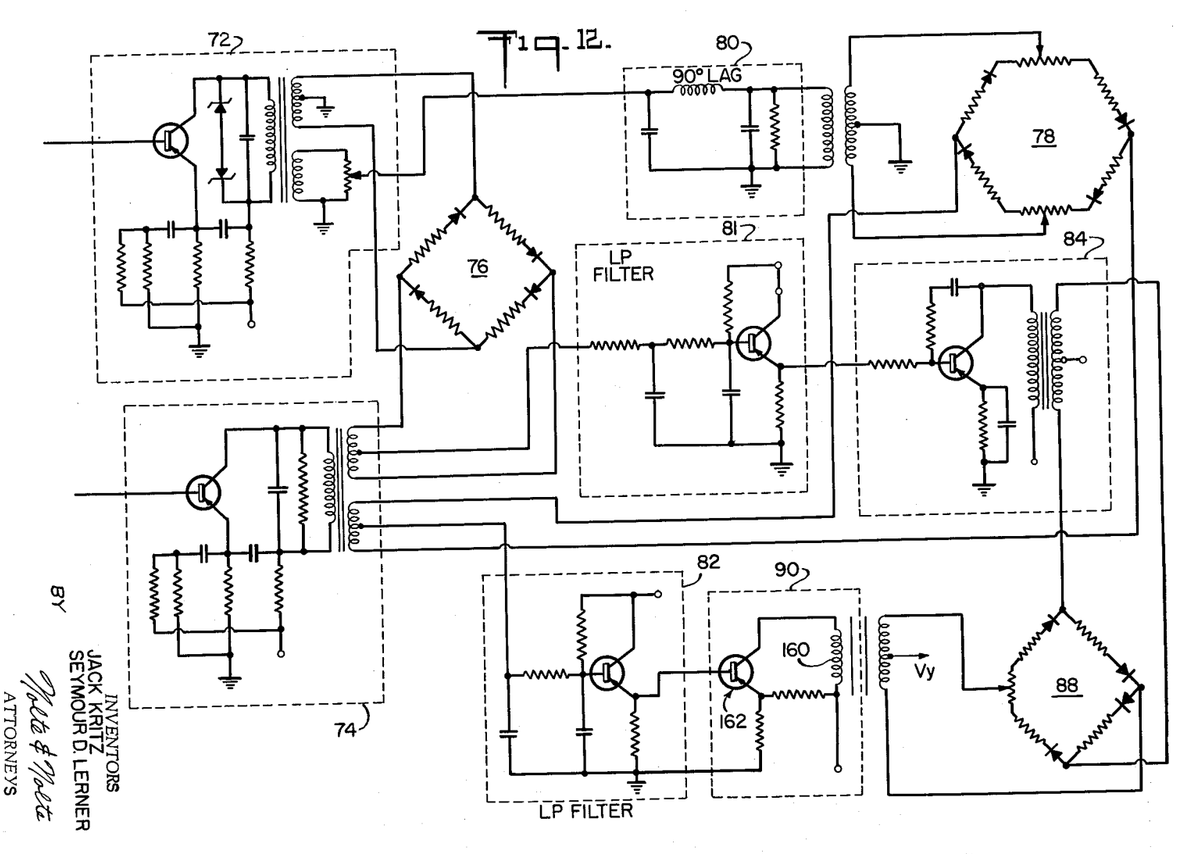
FIG. 12 is a schematic diagram of the discriminator illustrated in FIG. 5.
Figure 12C:
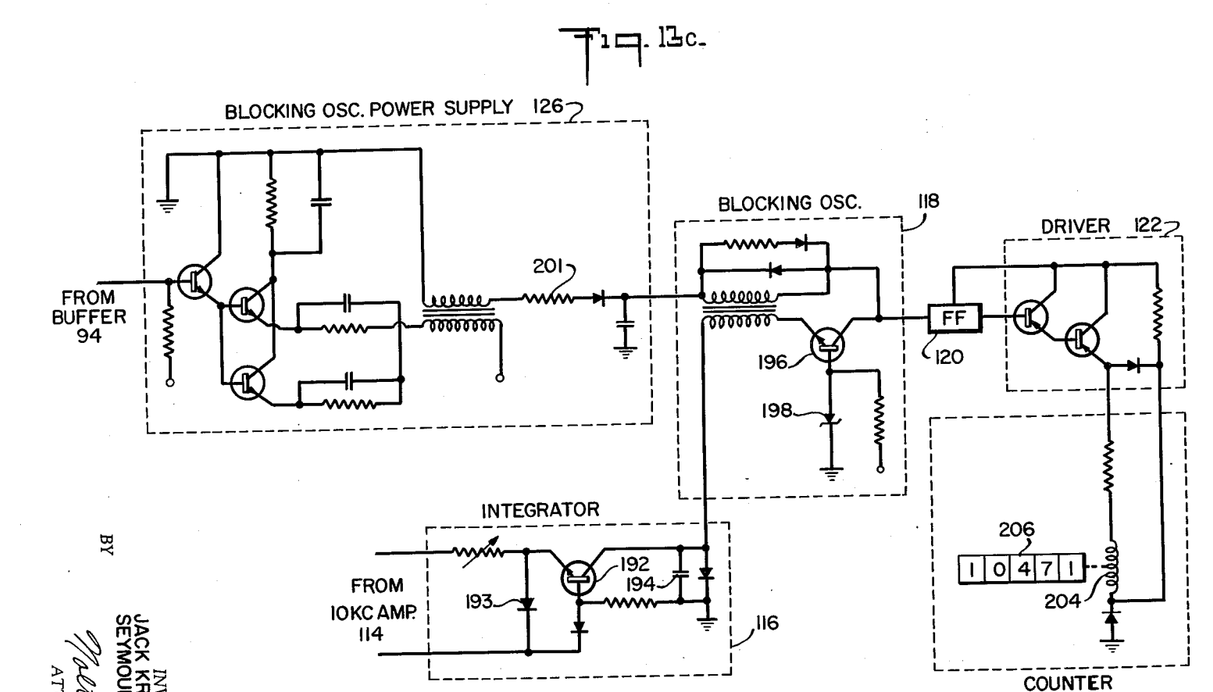

The output from amplifier 42 is coupled to amplifier limiter 72 of the fore-aft discriminator illustrated schematically in FIG. 12. The input to amplifier 74 of the discriminator is received from the output stage of amplifier 43, which, as previously noted, is identical to amplifier 42. The operation of the discriminator has been previously described and it is believed clear that the illustrated components are well known. For example, balanced mixers 76 and 78 and synchronous detector 88 may comprise conventional ring modulators. Although mixers 76 and 78 are theoretically balanced mixers, as a practical matter the audio outputs of these mixers will have a component of the carrier frequency and harmonics thereof superimposed upon them. Conventional low pass filters 80 and 82 remove the respective high frequency components.

The ninety-degree lag is provided by a conventional LC delay unit 80 which is coupled between the output of amplifier 72 and a pair of inputs to ring modulator 78. The differentiator 90 is an RL circuit including the primary inductance of transformer 160 and the output impedance of transistor 162.

The D.C. outputs $V_Y$ and $V_X$ from the discriminator 46 and 48 are coupled to computer 50 schematically illustrated in FIGS. 13A–13D. The voltages $V_Y$ and $V_X$ are passed through filters 98 and 106 where capacitors 164 and 166, respectively, filter out any high frequency components which may be present on the direct voltages. From there, the voltages are passed to the emitters of respective chopper transistors 168 and 170, respectively, whose base electrodes are coupled to the reference voltages derived from oscillator 92. Buffer 94 provides isolation for oscillator 92 while drivers 96 and 102 are emitter followers for power amplification purposes. The components so far described are well known and the operation thereof obvious to one skilled in the art.

Figure 13A:
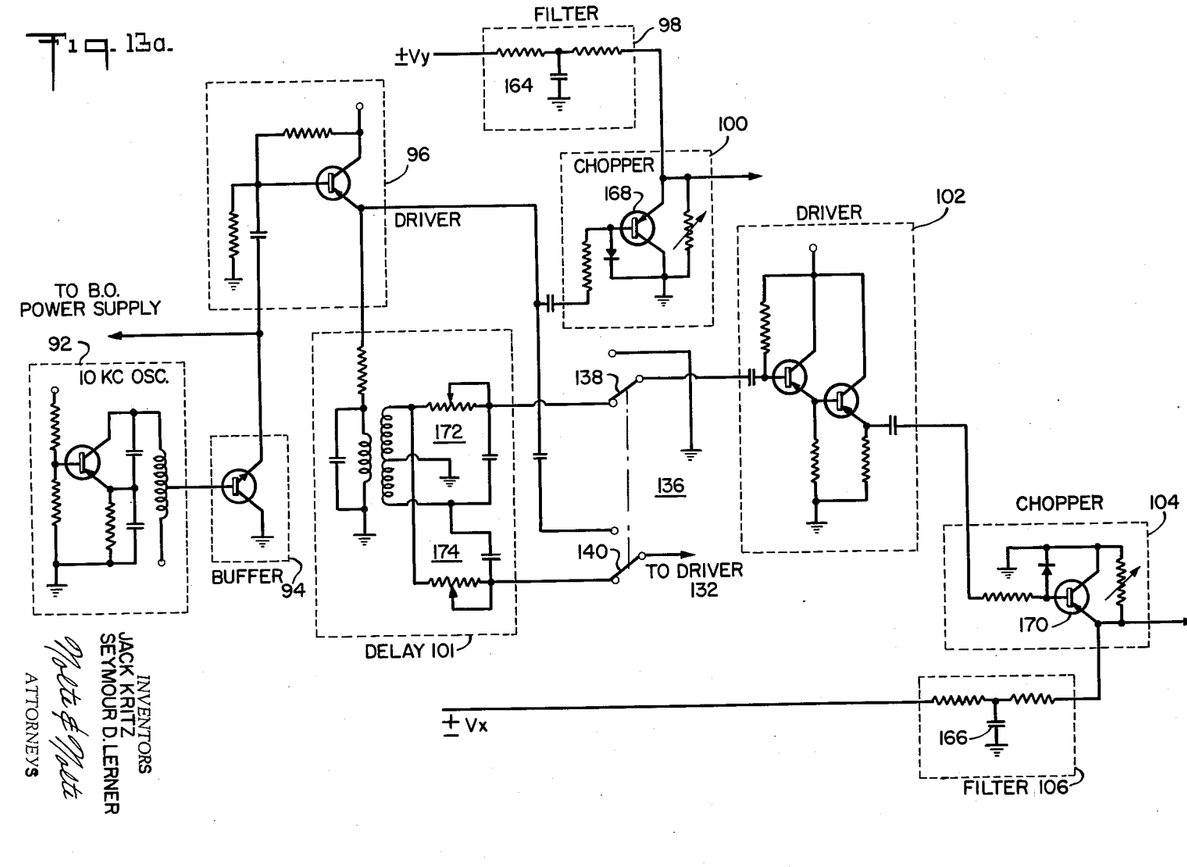
FIGS. 13A, B, C, and D comprise a schematic diagram of the computer shown in FIG. 6.

Delay unit 101 comprises two parallel connected RC circuits 172 and 174, whose outputs are coupled to driver 102 and driver 132, respectively. The operation of headway switch 136 thus effectively grounds the base of driver transistor 102 while simultaneously coupling the base of driver 132 to the emitter of driver 96.

Figure 13B:
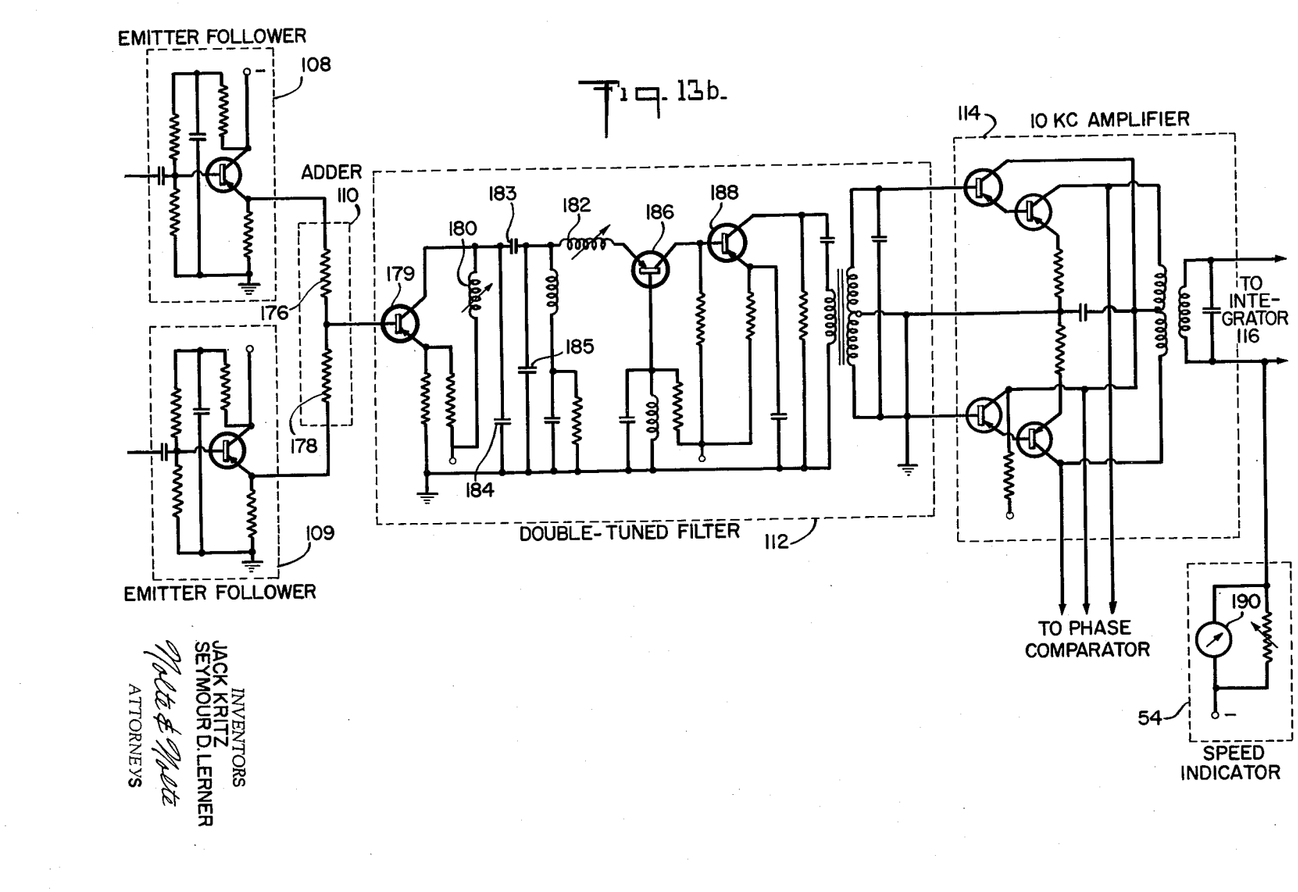

The combiner and speed indicator are shown schematically in FIG. 13B. The alternating voltages proportional to the velocity of the fore-aft and port-starboard directions are coupled through emitter followers 108 and 109, respectively, to adder 110 which comprises resistors 176 and 178. It will be recalled that the purpose of the double-tuned, broad band filter 112 is to convert the complex wave form at the junction of resistors 176 and 178 to a sine wave having a magnitude proportional to the vectorial sum of the velocities in the Y and X directions. The input stage of filter 112 is an emitter follower 179. The characteristics of this filter are well known, the tuning in the present case being provided by variable inductances 180 and 182 while the coupling between the stages is fixed by capacitors 183, 184 and 185. The current through inductor 182 is proportional to the desired sine wave and is converted to an alternating voltage by transistor 186. The collector voltage of transistor 186 is then fed to the base of an amplifier 188, whose output voltage is transformer coupled to ten kc. amplifier 114 which, as shown, may be conventional push-pull amplifier. An output of amplifier 114 is then transformer coupled to speed indicator 54 wherein the average value of the output voltage is measured by meter 190 which may be calibrated to indicate the speed in any desired manner.

The distance measuring circuits of the computer are shown schematically in FIG. 13C. The power output from push-pull amplifier 114 is coupled to the emitter of transistor 192 of integrator 116. Diode 193 removes the positive half of the alternating voltage so that capacitor 194 is only charged by the negative pulses. One end of capacitor 194 is coupled to the emitter of a transistor 196 of blocking oscillator 118. A Zener diode 198 is connected between the base of transistor 196 and ground to act as a reference voltage for the charge on capacitor 194. Thus, when capacitor 194 is charged to a voltage determined by diode 198, the oscillator is fired in a well known manner translating a pulse to flip-flop 20, and at the same time discharging capacitor 194 through the emitter-base circuit of transistor 196. After the capacitor is discharged, it again begins to accumulate a voltage as determined by the magnitude of the pulses from amplifier 114 until the predetermined voltage is again reached. The blocking oscillator is fired for the second time, causing flip-flop 120 to emit an output pulse which is transmitted through driver 122 to solenoid 204 which steps a mechanical indicator 206 to indicate the distance traveled. Thus, counter 206 is stepped one unit for every two output pulses from blocking oscillator 118.

Figure 13D:
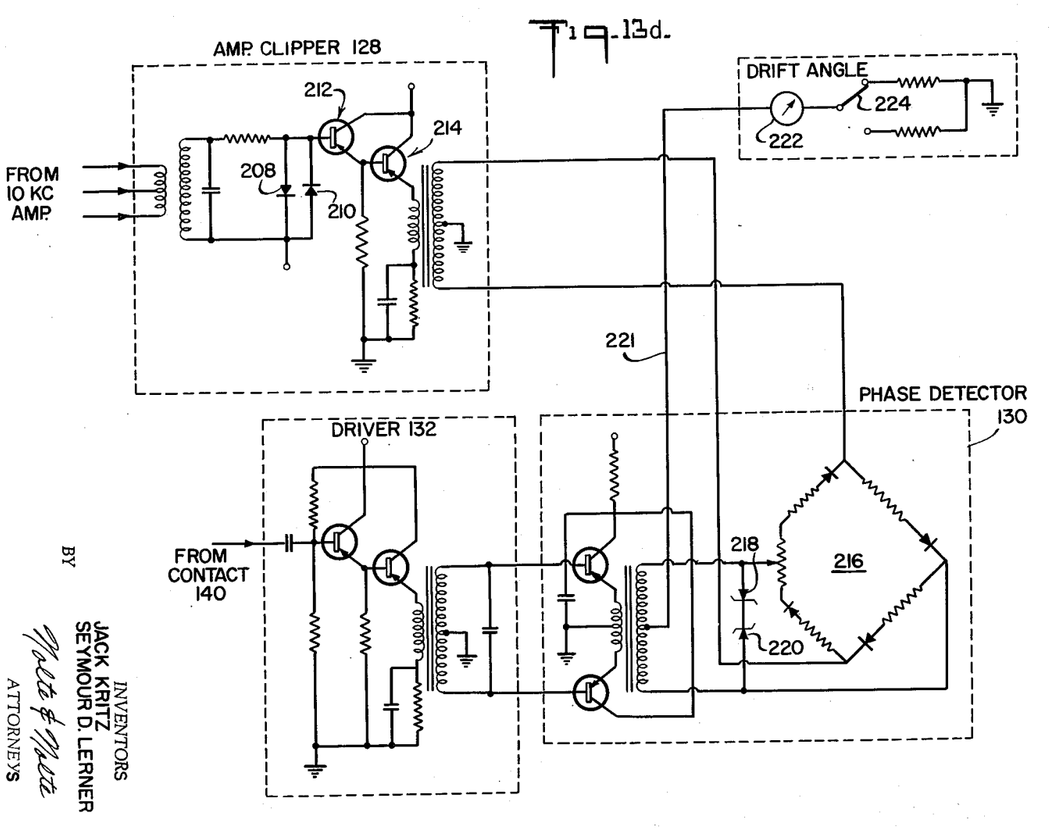

FIG. 13D illustrates schematically phase comparison circuit 70 of the computer. In this case also the circuits are well known in the electronics art. Diodes 208 and 210 of amplifier clipper 128 conduct at a predetermined voltage and limit the input to emitter followers 212 and 214 to a predetermined level. The output of the last stage 214, effectively a square wave, is transformer coupled to one side of a ring modulator bridge 216. The other input to bridge 216 is derived from headway switch contact 140 through a two stage driver 132. This voltage is clipped by back-to-back Zener diodes 218 and 220 so that bridge 216 effectively compares two square waves. In one sense, the output from amplifier clipper 128 may be considered as a gating input to bridge 216 which passes or gates simultaneously-occurring pulses from driver 132. The fluctuating coincident pulses, whose average value is indicative of the phase between the two inputs, are fed via output line 221 to a volt meter 222 which is calibrated as shown in FIG. 9 to indicate the drift angle of the boat. As previously mentioned, a switch 224 may be further provided to provide an expanded scale for meter 222 in a well-known manner.

Figure 14:
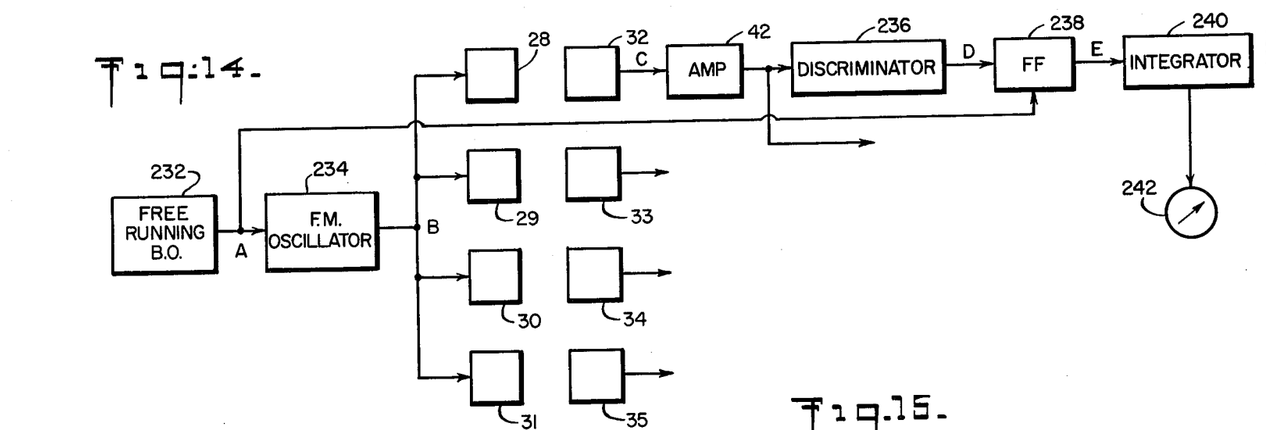
FIG. 14 is a block diagram of the system in conjunction with the depth meter circuits.

FIGURE 14 illustrates the manner in which the Doppler system, above-described, can be modified to indicate the depth of the water. In this instance, the transmitter oscillator 40 is replaced by a free running blocking oscillator 232 and a frequency modulated oscillator 234. The connection is such that oscillator 234 is shifted from the normal carrier frequency (e.g. 980 kc.) to a higher frequency (e.g. 990 kc.) when a pulse is applied thereto by blocking oscillator 232. The output of oscillator 234 is coupled to transducers 28, 29, 30 and 31, whereby acoustical energy is beamed towards the ocean floor as described-above with reference to FIGURE 1.

The time required for a transmitted signal from any transducer to be reflected back to the boat is proportional to the depth of the water. The frequency modulated carrier signal enables this time interval or delay to be recognized. Accordingly, the depth meter receiving circuits may be coupled to the output of the IF amplifier in any of the four receiving channels. As illustrated in FIG. 14, amplifier 42, associated with receiving transducer 32, is employed. It is to be understood that the previously described components of the overall system remain unchanged, and are therefore not illustrated in FIG. 14. The output of amplifier 42 will include, in addition to a Doppler frequency shift, a pulse FM signal delayed with respect to the output of blocking oscillator 232 by an amount equal to the above mentioned time interval. The remaining circuitry produces a measurable signal which relates this signal to the actual depth of the water.

A discriminator 236 is coupled to the output of amplifier 42. The output of discriminator 236 is a series of clock pulses having the same frequency as the output pulses of blocking oscillator 232, but delayed with respect thereto by an amount proportional to the depth of the water. A bistable flip-flop 238 has one input coupled to the output of discriminator 236 and its other input coupled to the output of blocking oscillator 232, so that flip-flop 22 maintains a fixed voltage for a time interval equal to the delay between the discriminator and oscillator pulses. Since this delay is related to the depth, the output of flip-flop 238 may be coupled to an integrator 240 to produce a voltage indicative of the average delay between these pulses. This voltage is applied to meter 242 which is properly calibrated so that its needle deflection will provide a scale reading of the depth of the water.

Figure 15:
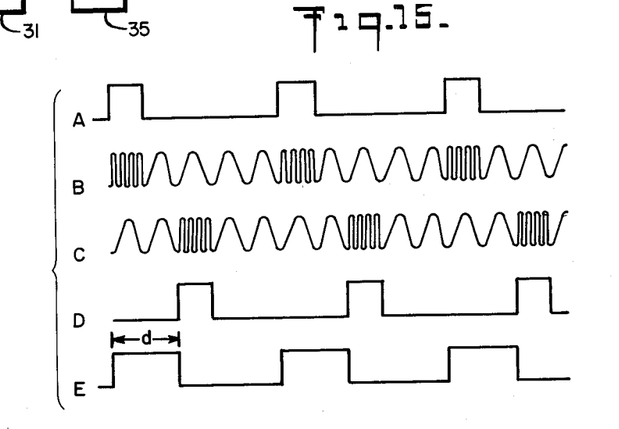
FIG. 15 shows the waveforms appearing at various points of the depth meter circuit.

FIGURE 15 illustrates the wave forms appearing at various points in the circuit during operation thereof. These wave forms are for purposes of explanation only, and are not intended to accurately indicate the actual voltages existing in the system. Wave form A indicates the pulses appearing at the output of blocking oscillator 232. These pulses frequency-shift oscillator 234 as shown in wave form B. The reflected signals picked up by receiving transducer 32 have effectively the same shape as the output of FM oscillator 234 but are delayed with respect thereto as shown in wave form C. For purposes of simplicity, the frequency modulated voltages are shown without the Doppler frequency shifts imposed thereon. The output of discriminator 236 is shown at D and comprises a train of pulses delayed with respect to the output of blocking oscillator 232. The length of time during which flip-flop 238 is in one of its two stable states, as shown by wave form E, indicates the relative delay between the output pulses from discriminator 236 and blocking oscillator 232. As described-above, the flip-flop output pulses are integrated and then measured in a conventional manner to indicate the depth of the water.

Figure 16:
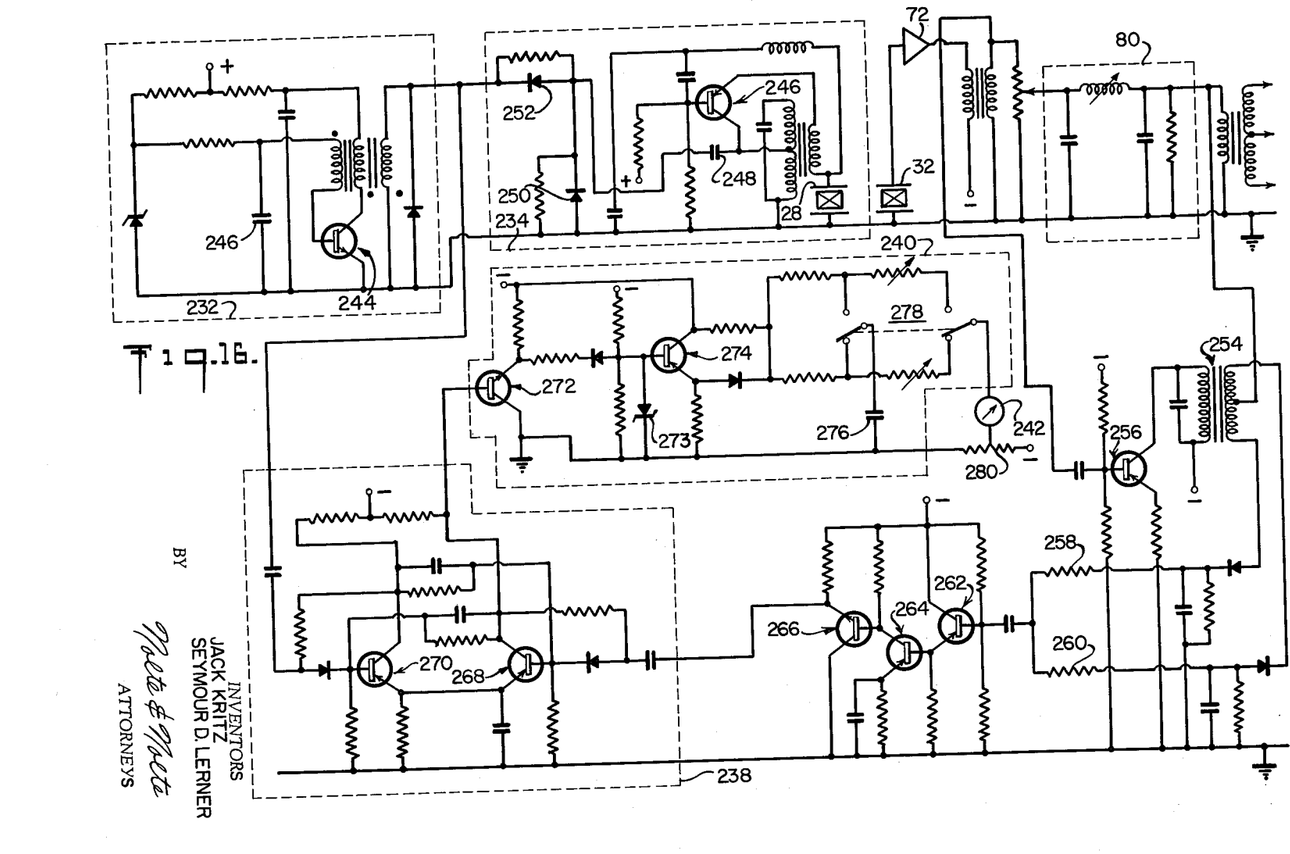
FIG. 16 is a schematic diagram of the depth meter shown in FIG. 14.

FIGURE 16 is a schematic diagram of the depth meter illustrated in FIGURE 14. Free-running blocking oscillator 232 is conventional and includes a transistor 244 adapted to back bias itself whenever it is fired. After the blocking oscillator is fired, it remains cut off until sufficient negative charge has leaked off capacitor 246, at which time the oscillator is re-fired and the capacitor recharged to cut off conduction. In one operative embodiment, the blocking oscillator produced a pulse output of one hundred micro-seconds duration, while remaining in its "off" state for one-tenth of a second. This corresponds to a duty cycle of 1/1000.

The pulse output of blocking oscillator 232 frequency modulates oscillator 234 by removing capacitance from the tank circuit of the oscillator. Basically, the oscillator is the same as that described above with reference to FIGURE 10, wherein the transmitting transducers 28–31 serve as a portion of the oscillator capacitance. In FIGURE 16, although only one transducer 28 is illustrated, it is to be understood that the remaining transducers 29, 30 and 31 are connected in parallel therewith. An additional capacitance 248, which is normally connected in the collector circuit of transistor 246, is removed from the circuit when a positive pulse occurs on the output of blocking oscillator 232, cutting off a pair of diodes 250 and 252. With these diodes not conducting, capacitor 248 is effectively removed from the tank circuit, and the frequency of the oscillator slightly increased.

In addition to the transmitter circuits described above, a 1 mc. receiver is required for the fathometer. Furthermore, if the above-described Doppler system is employed, the fore-aft or port-starboard discriminator may be uniquely employed to simplify the fathometer discriminator. The output of amplifier 72 of a Doppler discriminator (e.g., the fore-aft discriminator) is amplified by transistor 256, whose collector circuit contains tuned-circuit 254. This tuned circuit output is transformer coupled, with the output of ninety-degree delay unit 80 in series with the transformer center-tap, to opposite-polarity peak detectors and adding resistors 258 and 260. When an on-frequency signal is received, the voltage across tuned circuit 254 is in phase with the input, while the output of delay unit 80 lags the input by ninety-degrees. The two voltages connected in series with this delay unit output are equal in magnitude and opposite in phase. Thus, the resultant sine waves applied to the two peak detectors are equal in magnitude, each being the sum of the delay unit 80 output and one of two equal voltages at ninety degrees. The summation of resistors 258 and 260 is, therefore, zreo. On the other hand, if a frequency slightly off the center-frequency of tuned circuit 254 is received, circuit 254 produces a phase shift which causes the phase of the two components of each detector input to shift away from ninety degrees, in one case decreasing, in the other case increasing. This, in turn, leads to a difference in the magnitudes of the two summed signals, thereby producing a non-zero discriminator output. This arrangement yields the well-known Foster-Seeley discriminator curve of output voltage versus frequency, wherein use is made of existing Doppler discriminator circuitry to eliminate the conventional and critical double-tuned circuit.

The output of discriminator 236 is coupled through three transistor amplifier stages 262, 264 and 266 to the reset input of flip-flop 238. The flip-flop is conventional and includes two transistors 268 and 270. The base of transistor 270 is the set input of the flip-flop and is energized by the appearance of a pulse on the output of the free-running blocking oscillator 232. The collector of transistor 268 will thus be at a high potential for a period of time equal to the delay between the transmitted pulses from blocking oscillator 232 and the received pulses from discriminator 236. Integrating circuit 240 includes an input amplification stage 272 and a Zener diode 273 to maintain the amplitude of the flip-flop pulses at a predetermined level. These pulses are coupled by an emitter follower 274 to an integrating capacitor 276 which averages out these pulses prior to applying them to meter 242. A double-pole, double-throw switch 278 may be used to alter the resistance in the integrating circuit so that the meter may be calibrated for a full-scale deflection of, for example, fifty and two hundred feet. A potentiometer 280 serves to adjust the zero reading of the meter.

The depth meter as above-described has many significant advantages either as a separate entity or in combination with the Doppler system herein described. In this respect, the fact that the fathometer would be compatible with a Doppler navigation system is an important advantage. Equally significant, however, is the fact that the carrier is always on, resulting in all of the signal-to-noise advantages of a continuous wave system, while at the same time retaining the circuit simplicity inherent in a pulse-modulated system.

Although a specific embodiment has been described, many modifications thereof will be obvious to one skilled in the art, and the invention should not be limited except as defined in the following claims.

We claim:

1. Doppler navigation apparatus for use with an object traveling on or through a body of water, comprising first transducer means in said object for radiating acoustic energy downwardly along the fore-aft axis and port-starboard axis of said object, second transducer means for receiving the energy reflected from the bottom of the body of water, the voltage outputs of said second transducer means having Doppler frequency shifts related to respective velocity components of said object along the fore-aft and port-starboard axes of said object, discriminator means responsive to said Doppler frequency shifts for producing direct voltages indicative of said respective velocity components, and computer means for combining said direct voltages to produce signals indicative of the total velocity of said object, said computing means including comparison means for comparing said signals indicative of the total velocity with signals indicative of one of said velocity components whereby the sign and magnitude of the drift angle of said object relative to its fore-aft axis may be measured.

2. Doppler navigation apparatus according to claim 1, wherein said computer includes means for integrating said signals indicative of the total velocity with respect to time in order to manifest the distance traversed by said object.

3. Doppler navigation apparatus according to claim 1, wherein said computer includes means for converting the output voltages of said discriminator means into component alternating voltages ninety degrees out of phase, means for adding said alternating voltages to produce an alternating voltage relative to the total velocity of said object, comparison means for comparing the phase of said total alternating voltage with the phase of one of said component alternating voltages and wherein said apparatus further includes means responsive to said comparison means for indicating the sign and magnitude of the drift angle of said boat relative to the fore-aft axis thereof.

4. Doppler navigation apparatus according to claim 1, including means for indicating whether the movement of said object is toward or away from its desired destination.

5. Doppler navigation apparatus according to claim 3, including means for indicating whether the movement of said object is toward or away from its desired destination.

6. Doppler navigation apparatus for determining the velocity of an object with respect to the floor of a body of water, comprising first and second transducer means mounted in said object and adapted to transmit acoustic energy in fore and aft directions, respectively, third and fourth transducers adapted to transmit acoustic energy in port and starboard directions, respectively, first, second, third and fourth corresponding receiver transducers adapted to receive the acoustic energy reflected from said floor whereby said first and second receiving transducers produce Doppler frequency shifts relative to the velocity component of said object along the fore-aft axis thereof, and said third and fourth receiving transducers produce Doppler frequency shifts relative to the velocity component of said object along the port-starboard axis thereof, a fore-aft discriminator responsive to the outputs of said first and second receiving transducers for producing a direct voltage having a magnitude proportional to the magnitude of the fore-aft velocity component and a polarity indicative of the direction of said fore-aft velocity, a port-starboard discriminator for producing a direct voltage having a magnitude relative to the port-starboard velocity component and a polarity indicative of the direction of said port-starboard velocity, and computer means for combining said direct voltages to produce a signal indicative of the total velocity of said object.

7. Doppler navigation apparatus according to claim 6, wherein said computer comprises means for converting the output voltages of said discriminators to alternating component voltages ninety degrees out of phase, and adding means for summing said alternating component voltages.

8. Doppler nagivation apparatus according to claim 7, wherein said computer further includes phase comparator means for comparing the phase of the alternating voltage output of said adding means with the phase of one of said alternating component voltages in order to indicate the drift angle of said object.

9. Doppler navigation apparatus according to claim 8, including headway means for indicating whether the movement of said object is toward or away from the desired destination.

10. Doppler navigation apparatus according to claim 6, wherein each of said discriminators includes a first and second balanced mixer, said first balanced mixer being coupled directly to the output of two associated receiving transducers, said second balanced mixer being coupled to the outputs of said associated transducers, one of said transducer outputs being delayed by nintey degrees, each of said balanced mixers producing an output frequency proportional to the frequency difference between the voltages applied to its input, nintey degree lead means coupled to the output of said second balanced mixer, and a synchronous detector coupled from the output of said first balanced mixer and the output of said lead means for producing said direct voltage.

11. Doppler navigation apparatus according to claim 6, including a first D.C. to A.C. converter connected from said fore-aft discriminator, a second D.C. to A.C. converter connected from said port-starboard discriminator, adding means for summing the outputs of said first and second converters, comparator means for comparing the phase of the alternating voltage output of said adding means with the phase of the output of one of said converters to indicate the drift angle of said object, and switch means for introducing a phase shift into one of the inputs to said comparator means whereby to indicate whether said object is moving toward or away from the desired destination.

12. In combination, a Doppler navigation device and a depth meter, comprising means for generating clock pulses at fixed intervals, means for generating a continuous wave signal, means for modulating said continuous wave signal in response to said clock pulses, first transducer means responsive to said modulating means for directing acoustical waves towards the ocean floor, second transducer means for receiving the acoustical waves reflected from the ocean floor and converting said reflected waves into an electrical signal, means responsive to the Doppler frequency shift of said received signals for producing a signal relative to the velocity of said first transducer means with respect to said ocean floor, and additional means responsive to said received signals for producing a signal proportional to the height of said first transducer means above the ocean floor.

13. The combination according to claim 12, wherein said means for generating a continuous wave signal and said means for modulating comprises a frequency-modulated oscillator adapted to be shifted between two separate frequencies in response to said clock pulses.

14. The combination according to claim 13, wherein said means responsive to the Doppler frequency shift includes means for determining the velocity components of said first transducer means in two separate directions.

15. A depth meter comprising means for generating clock pulses at fixed intervals, means for generating a continuous wave signal, means for modulating said continuous wave signal in response to said clock pulses, a first transducer responsive to said modulating means for directing acoustical waves towards the ocean floor, a second transducer for receiving the acoustical waves reflected from the ocean floor and converting said reflected waves into an electrical signal, means for de-modulating the received electrical signal, means comparing said de-modulated signal with said clock pulses to determine the relative delay therebetween, and means responsive to said relative delay for indicating the depth of the water.

16. A depth meter according to claim 15, wherein said means for generating a continuous wave signal and said means for modulating comprises a frequency-modulated oscillator adapted to be keyed between two separate frequencies in response to said clock pulses.

17. A depth meter according to claim 16, wherein said de-modulating means comprises a discriminator for producing a pulse output corresponding to said keyed FM signals.

18. A depth meter according to claim 17, wherein said comparison means includes a bistable flip-flop having one input coupled to said discriminator output and the other input coupled to said clock pulse source, and means for integrating the output pulses of said flip-flop.

19. A Doppler navigation system for use with an object travelling on or through a medium, comprising: a first transducer in said object for radiating acoustic energy downwardly along the lateral axis and longitudinal axis of said object; a second transducer for receiving the energy reflected from the bottom of said medium, the output signals of said second transducer having Doppler frequency shifts related to respective velocity components of said object along the lateral and longitudinal axes of said object; a discriminator responsive to said Doppler frequency shifts for producing signals indicative of said respective velocity components, and a computer means for combining said signals to produce further signals indicative of the total velocity of said object, said computing means comprising comparison means for comparing said signals indicative of the total velocity with signals indicative of one of said velocity components whereby the sign and magnitude of the drift angle of said object relative to the longitudinal axis may be measured.

20. Doppler navigation apparatus for determining the velocity and direction of an object with respect to the floor of a body of water, comprising first and second transducer means mounted in said object and adapted to transmit acoustic energy in fore and aft directions, respectively, third and fourth transducers adapted to transmit acoustic energy in port and starboard directions, respectively, first, second, third and fourth corresponding receiver transducers adapted to receive the acoustic energy reflected from said floor whereby said first and second receiving transducers produce Doppler frequency shifts relative to the velocity component of said object along the fore-aft axis thereof, and said third and fourth receiving transducers produce Doppler frequency shifts relative to the velocity component of said object along the port-starboard axis thereof, a fore-aft discriminator responsive to the outputs of said first and second receiving transducers for producing a direct voltage having a magnitude of the fore-aft component and a polarity indicative of the direction of said fore-aft velocity, a port-starboard discriminator for producing a direct voltage having a magnitude relative to the port-starboard velocity component and a polarity indicative of the direction of said port-starboard velocity, and computer means for combining said direct voltages to produce signals indicative of the total velocity and drift angle of said object.

References Cited by the Examiner
UNITED STATES PATENTS

| | | | |
|---|---|---|---|
| 1,864,638 | 6/1932 | Chilowsky | 340—3 |
| 2,451,822 | 10/1948 | Guanella | 343—12 |
| 2,500,638 | 3/1950 | Krauth | 340—1 |
| 3,028,578 | 4/1962 | Stanton | 340—1 |
| 3,095,562 | 6/1963 | Dworetzky et al. | 343—8 |
| 3,095,563 | 6/1963 | Vladimir | 343—8 |
| 3,099,832 | 7/1963 | Frelich | 343—8 |
| 3,102,264 | 8/1963 | Flower | 343—9 |
| 3,153,220 | 10/1964 | Hagemann | 340—3 |

OTHER REFERENCES

"Ultrasonic Doppler for Distance Measurement," by M. Wachspress, IRE Transactions on Ultrasonics Engineering, vol. UE-8, No. 1, March 1961 (pp. 6-13 relied on).

CHESTER L. JUSTUS, *Primary Examiner.*
R. A. FARLEY, *Assistant Examiner.*